United States Patent [19]
Lee

[11] 4,292,685
[45] Sep. 29, 1981

[54] APPARATUS AND METHOD FOR CONTROLLING CROSSPOLARIZATION OF SIGNALS IN A FREQUENCY REUSE SYSTEM

[76] Inventor: Lin-Shan Lee, P.O. Box 5874, Stanford, Calif. 94305

[21] Appl. No.: 911,954

[22] Filed: May 31, 1978

[51] Int. Cl.³ .................... H04B 7/155; H04B 7/185; H04B 15/00
[52] U.S. Cl. .............................. 455/12; 343/100 PE; 343/100 ST; 370/6; 455/52; 455/63; 455/295; 455/304
[58] Field of Search ....................... 325/60, 65, 62, 63, 325/367, 371, 472, 476, 477, 1, 3, 4, 56; 179/15 BP, 15 AN, 15 BC; 333/18, 28 R, 70 T, 21 A; 328/162, 165, 167; 343/100 PE, 200, 100 ST; 455/11, 12, 52, 59, 63, 71, 295, 303–306; 370/6

[56] References Cited

U.S. PATENT DOCUMENTS

| | | | |
|---|---|---|---|
| 3,986,123 | 10/1976 | Tirro et al. | 325/65 |
| 4,087,818 | 5/1978 | Kreutel, Jr. | 343/100 PE |
| 4,090,137 | 5/1978 | Soma et al. | 325/60 |
| 4,146,838 | 3/1979 | Takada | 455/63 |
| 4,146,893 | 3/1979 | Inagaki et al. | 325/65 |

OTHER PUBLICATIONS

Cooper, C. P., "Methods of Adaptive Cancellation for Dual Polarization Satellite Systems," Marconi Review, vol. 39, No. 200, pp. 1–24, First Quarter 1976.

Primary Examiner—Marc E. Bookbinder
Attorney, Agent, or Firm—Philips, Moore, Weissenberger, Lempio & Majestic

[57] ABSTRACT

Apparatus and method for controlling the crosspolarization of signals in a satellite communications, frequency reuse system. Each earth station in the system includes one crosscoupling network that compensates for the crosspolarization of signals transmitted by such earth station uplink to the satellite due to the propagative medium around such earth station, and an adaptive feedback control system having another crosscoupling network that compensates for the crosspolarization of signals received from the other earth stations due to such propagative medium around such earth station.

12 Claims, 5 Drawing Figures

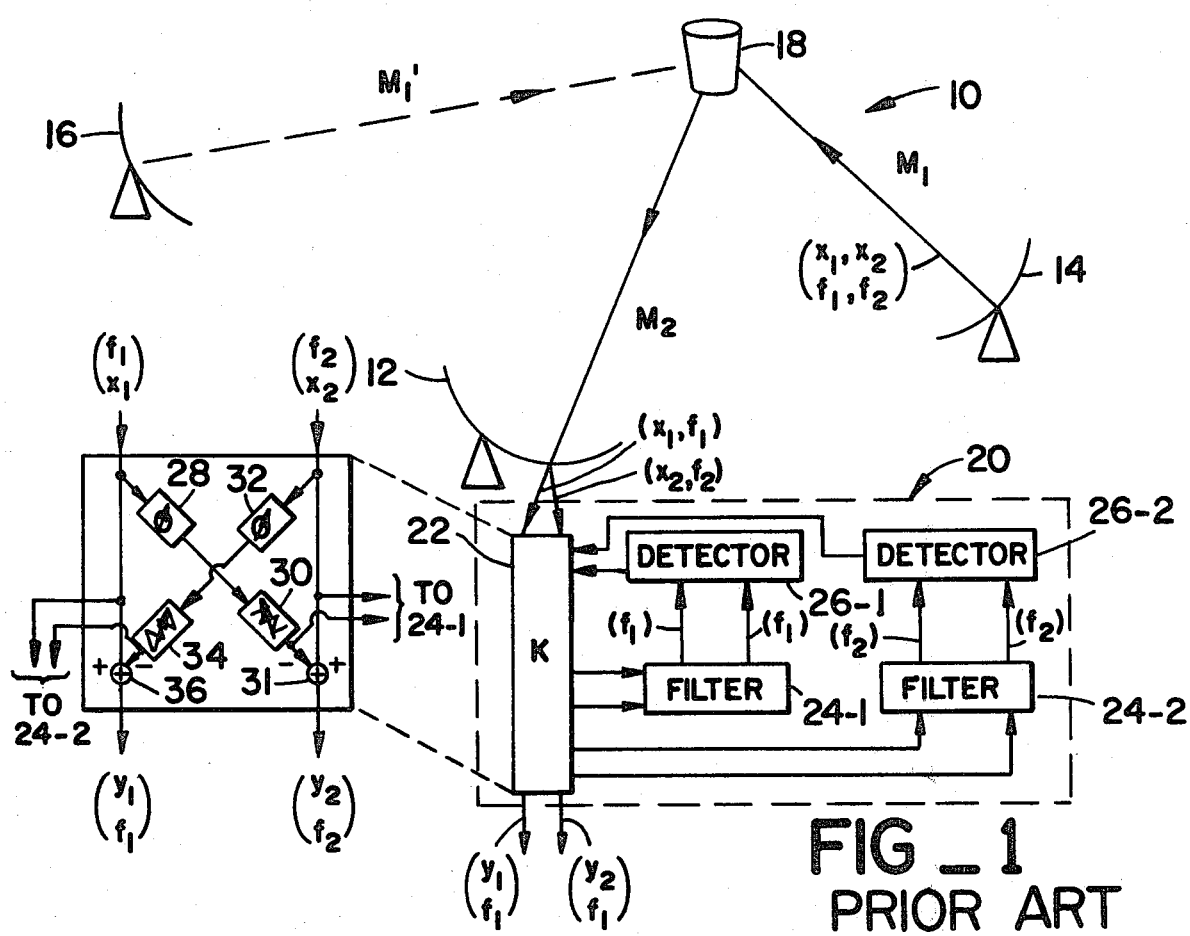
FIG_1 PRIOR ART
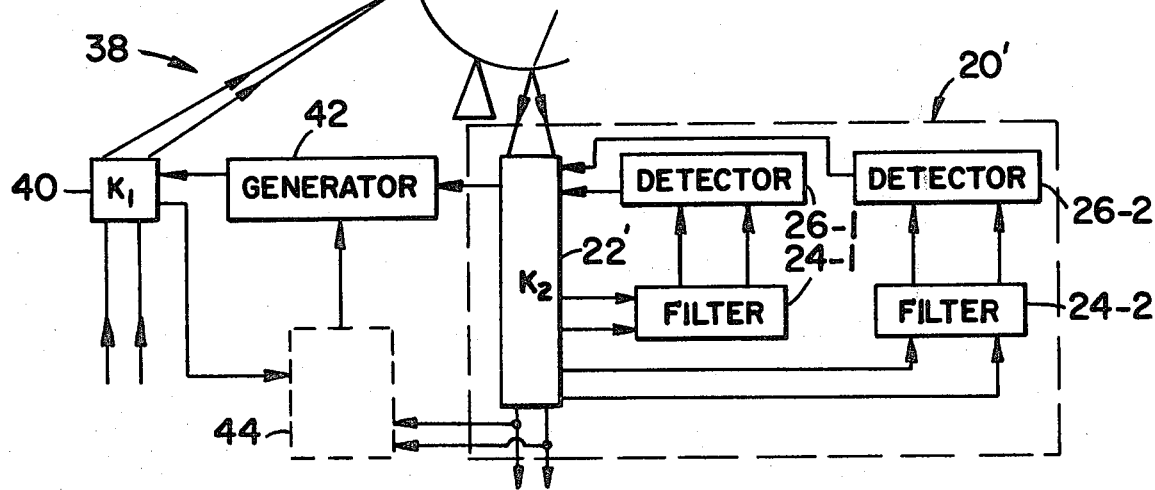
FIG_2

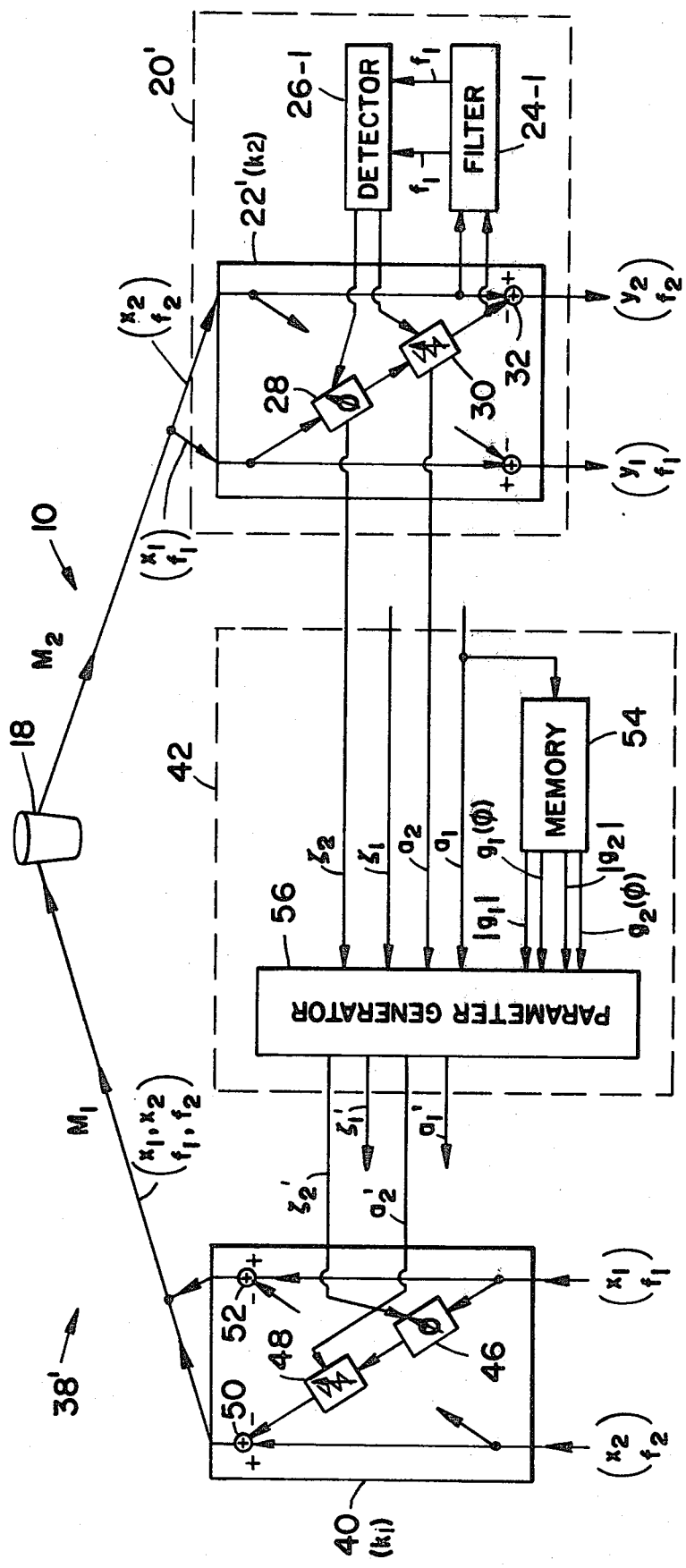
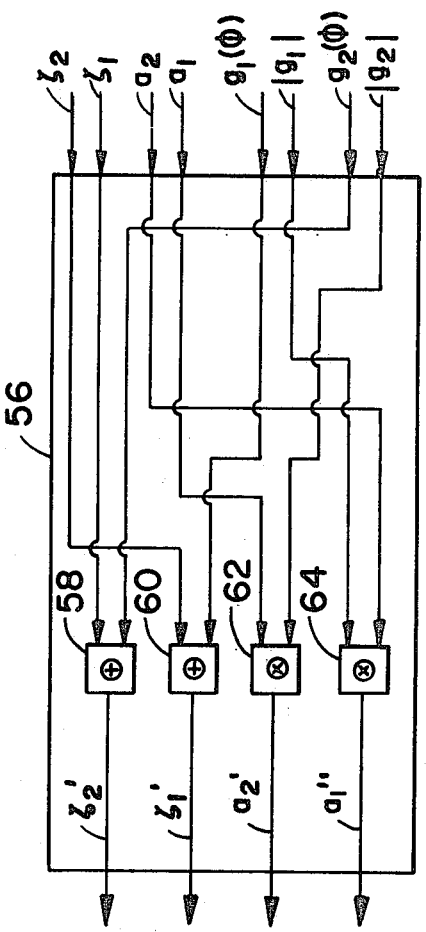
FIG-3
FIG-4

APPARATUS AND METHOD FOR CONTROLLING CROSSPOLARIZATION OF SIGNALS IN A FREQUENCY REUSE SYSTEM

BACKGROUND OF THE INVENTION

This invention relates generally to communications systems and, more particularly, to apparatus and methods for controlling crosspolarization of signals in a frequency reuse system in which dual polarized signals carry independent information at the same frequency.

In recent years, the demand for communications has grown tremendously, and an even more rapid growth is expected in the future. Both terrestrial communications systems and satellite communications systems have been improved and expanded to meet this demand. In the field of satellite communications, for example, because of its many advantages, even greater demand is placed on this form of communications. This has resulted in the allocated spectrum for satellite communications becoming more and more crowded.

In view of this demand, substantial efforts have been made to try to utilize the frequency spectrum more efficiently, particularly for satellite communications systems. One effort has resulted in a frequency reuse communications technique in which two signals having independent information share the same channel frequency. In other words, since two signals share a frequency, every frequency in the spectrum can be used twice, thereby expanding the capacity of the communication channels by a factor of two.

One way to achieve a frequency reuse technique is to employ orthogonal polarizations, that is, dual signals which are orthagonally polarized in relation to one another. Typically, the two signals are either linearly polarized, in which the signals are transmitted at right angles to one another, or are oppositesensed circularly polarized, in which the two signals rotate in opposite directions.

The feasability of the frequency reuse technique depends on the amount of discrimination which can be achieved between the two signals. For various reasons, during the transmission of the signals there will always be some amount of signal energy transferred from one polarization to the other. This energy transfer is called the crosspolarization effect, which will result in some level of interference in each of the two signals. The extent of this effect determines the performance of the dual-polarization system.

There are many sources in the communications link which will cause the crosspolarization effect. In transmitting and receiving systems generally, for example, the antennae, the wave guide, and the orthomode transducer can cause crosspolarization. In a satellite communications system, in the propagative medium, the rain, clouds, snow, etc., can cause crosspolarization. Among all the crosspolarization effects, rain-crosspolarization at microwave frequencies has been found to be the most serious problem. This is owing to the fact that the problems in the transmitting and receiving systems can be improved by carefully designing these systems. The effects of clouds and snow are negligible compared to the effect of rain drops, but the rainfall, of course, can not be controlled.

Many different systems have been designed to solve the rain-crosspolarization problem in satellite communications systems. While these systems are different, their basic approaches are all the same. Each receiving earth station in the satellite communications system receiving a transmission of dual-polarized signals from one transmitting earth station, attempts to cancel the crosspolarization in the received signals induced by any rain at both the transmitting and receiving end. More particularly, a receiving station will have a network which is set or adjusted to cancel the crosspolarization of signals being received from the one transmitting station in the system.

A problem with the above cancellation system is that if a receiving or local station is intended to receive, simultaneously, fifty dual-polarized signals transmitted by fifty different transmitting or remote stations located around the world, then fifty such networks are necessary to cancel, respectively, the crosspolarization in the fifty dual-polarized signals being received. This is because it is not unlikely that the rain pattern at many, if not all, of the transmitting stations, may be different from one another. The different rain patterns produce different rain-crosspolarization effects, which means that the dual-polarized signals being propagated through the rain around one transmitting station will be crosspolarized differently than the dual-polarized signals being propagated through the rain around another transmitting station. Consequently, the receiving station will require the fifty different networks, each of which will be adjusted to cancel the crosspolarization of signals being received from a corresponding transmitting station.

SUMMARY OF THE INVENTION

It is an object of the present invention to provide a novel apparatus and method for cancelling or compensating for the crosspolarization of signals in a frequency reuse communications system.

It is another object of the present invention to compensate for or cancel the crosspolarization of signals in a satellite communications system utilizing a frequency reuse technique.

A yet other object of the present invention is to provide a relatively simple polarization compensating or cancelling system over prior systems in a satellite communications system having a plurality of earth stations in which a receiving station is able to receive simultaneously signals from a plurality of transmitting stations.

The foregoing and other objects of the invention are obtained by providing apparatus for controlling crosspolarization between signals propagated in a frequency reuse communications system having at least one remote station and a local station, the apparatus being for use at the local station, including first means for compensating for the crosspolarization of signals transmitted by the local station due to the propagative medium around the local station, and second means for compensating for the crosspolarization of signals received by the local station from the remote station due to the propagative medium around the local station.

The foregoing and other objects of the invention are also obtained by providing a method of controlling the polarization between signals propagated in a frequency reuse communications system having a plurality of stations in which the signals transmitted by each station are of different polarization and the propagative medium around each station causes the crosspolarization of signals transmitted and received by the stations, comprising, at each station, the steps of transmitting dual-polarized reference signals through the medium, receiving the transmitted reference signals through the medium, and adjusting the transmitted and received reference signals to compensate for the crosspolarization of the reference signals transmitted through the propagative medium and to compensate for the crosspolarization of the reference signals received through the propagative medium.

BRIEF DESCRIPTION OF THE DRAWINGS

FIG. 1 is a block diagram showing generally a prior system.

FIG. 2 is a block diagram showing generically the apparatus of the present invention.

FIG. 3 illustrates in more detail one embodiment of the present invention.

FIG. 4 shows schematically a function generator used in the embodiment of FIG. 3.

DETAILED DESCRIPTION OF THE DRAWINGS

Figure 5:
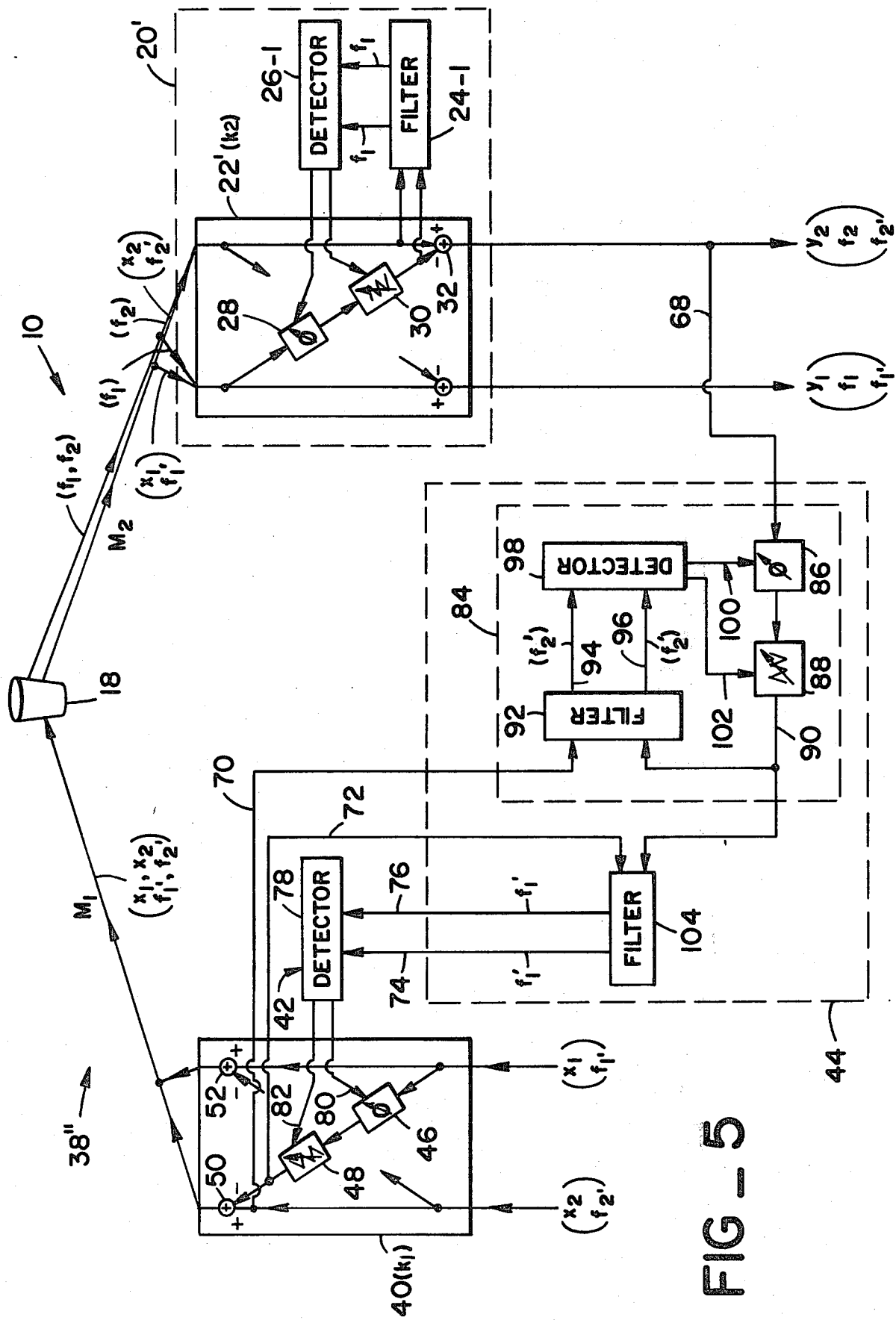
FIG. 5 illustrates in more detail another embodiment of the present invention.

In this specification, the structure, function and operation of the invention will be described in a manner to allow those skilled in the art to make and use the invention. However, it is recognized, in view of the nature of the subject matter of the invention, that those skilled in the art may want to understand more fully the mathematical and other principles under which the invention is designed. Consequently, there is included in this application an appendix which is attached after the descriptive portion of this specification and prior to the claims to become a part of this application. Occasionally, reference will be made throughout this specification to this appendix. Also, like reference characters are employed on FIGS. 1-5 of the application drawings and the appendix for a better understanding of the invention.

In FIG. 1, there is shown a satellite communications system 10 for carrying on communications between a plurality of earth stations 12, 14 and 16 via a communications satellite 18. Each one of the earth stations 12, 14 and 16 is capable of transmitting information to and receiving information from any of the other earth stations including the one earth station. For purposes of explanation, the earth station 14 is shown as transmitting information uplink to the satellite 18 through a propagative medium $M_1$, with the earth station 12 receiving this information through a propagative medium $M_2$, these links being shown in full lines. The earth station 14 is transmitting two signals $x_1$, $x_2$ which carry independent information and are orthogonally polarized, but are at the same frequency. As these signals $x_1$ and $x_2$ are transmitted uplink towards the satellite 18, the propagative medium $M_1$ will, particularly if it is raining around the station 14, crosspolarize these signals so that some amount of energy in each one of the signals $x_1$ and $x_2$ will be transferred to the other of these signals.

The signals $x_1$ and $x_2$ are then relayed by the satellite 18 to the earth station 12 through the propagative medium $M_2$. During this transmission through the medium $M_2$, these signals $x_1$ and $x_2$ again will be crosspolarized due to the medium $M_2$ around the station 12, particularly if it is raining. Thus, the station 12 receives not the pure signals $x_1$ and $x_2$, but the crosspolarized signal $x_1$ coupled with some energy from $x_2$, and the crosspolarized signal $x_2$ coupled with some energy from $x_1$. In other words, the received signals are $x_1$ plus $x_2$ at some amplitude and phase, and $x_2$ plus $x_1$ at some amplitude and phase.

An adaptive feedback control system 20, at the earth station 12, receives the crosspolarized signals $x_1$ and $x_2$ and cancels, or at least substantially compensates for, the crosspolarization in these respective signals to provide two output signals $y_1$ and $y_2$, corresponding to the pure signals, respectively, $x_1$ and $x_2$ transmitted at the station 14. The system 20 includes a crosscoupling network K or 22 which receives the crosspolarized signals $x_1$ and $x_2$, filters 24-1 and 24-2 that filter, respectively, reference or pilot signals $f_1$ and $f_2$, to be more fully described, from the network K, and amplitude and phase detectors 26-1 and 26-2 which respond, respectively, to the filtered reference signals to control the network 22.

As illustrated in FIG. 1, the corsscoupling network 22 includes an adjustable phase shifter 28 and an adjustable attenuator 30 leading to an adder 31, crosscoupled with an adjustable phase shifter 32 and an adjustable attenuator 34 leading to an adder 36. In the network 22, the crosspolarized received signal $x_1$ is fed through the phase shifter 28 and attenuator 30 to the adder 31 where it is added to the crosspolarized received signal $x_2$. The phase shifter 28 and attenuator 30, if set properly, adjusts the phase and amplitude of the received signal $x_1$ such that it will cancel in the adder 31 the amount of energy of the signal $x_1$ crosspolarized into received signal $x_2$, whereby the output will be signal $y_2$. Similarly, the received signal $x_2$ is fed through the phase shifter 32 and attenuator 34 to the adder 36 where it is added to the received signal $x_1$. If the shifter 32 and attenuator 34 are set properly, the phase and amplitude of the received signal $x_2$ will be adjusted such that in the adder 36, the amount of signal energy of signal $x_2$ in the received signal $x_1$ will be cancelled to provide the output $y_1$.

Proper adjustment or setting of the adjustable components 28, 30, 32 and 34 occurs in the following manner. The earth station 14 transmits with the signals $x_1$ and $x_2$ the two, orthogonally polarized, pilot or reference signals $f_1$ and $f_2$ having the same amplitude, but different frequencies from one another. These pilot signals $f_1$ and $f_2$ are crosspolarized in the same manner as the signals $x_1$ and $x_2$ by the propagative media $M_1$ and $M_2$ so as to have some of their signal energy transferred to each other during transmission. Before passing completely through the crosscoupling network 22, the signals $x_1$, $x_2$, $f_1$ and $f_2$ are fed to the filters 24-1 and 24-2. Filter 24-1 filters out the pilot signals $f_1$ in the paths shown in FIG. 1, respectively, and sends them to the amplitude and phase detector 26-1. The detector 26-1 then produces two output voltages proportional to the difference, respectively, in phase and amplitude of the two input signals $f_1$. One voltage signal is then used to adjust the phase shifter 28, while the other voltage signal is used to adjust the attenuator 30. When the difference in amplitude and phase of the filtered signals $f_1$ is 0, then the phase shifter 28 and attenuator 30, will be set such that the pure signal $y_2$ can be obtained.

Similarly, filter 24-2 filters the signals $f_2$ in the paths shown in FIG. 1, with the detector 26-2 producing two voltage signals proportional to the amplitude and phase difference of the input signals $f_2$. These voltage signals then adjust the phase shifter 32 and attenuator 34, and when the difference in amplitude and phase of the signals $f_2$ is 0, the shifter 32 and attenuator 34 will be set such that the pure signal $y_1$ can be obtained. Thus, the adaptive feedback control system 20 will be set to receive and cancel the crosspolarization of signals transmitted by the station 14 to the station 12.

Different rain conditions will crosspolarize signals differently. It will be appreciated that the earth station 16 may be experiencing a different rain condition than the earth station 14. Consequently, the crosspolarized signals transmitted uplink through the propagative medium $M_1'$ from the station 16 will be crosspolarized differently than the signals propagated through the medium $M_1$ from the station 14. Therefore, if the adaptive feedback control system 20 is set to cancel the crosspolarization of signals from the station 14, the system 20 will not be set to cancel signals received simultaneously from the earth station 16. If only this one system 20 were at the station 12, the output signals from the crosscoupling network 22 transmitted by the station 16 could still have some interference due to the crosspolarization effect and the inability of the system 20 to satisfactorily cancel this. There could be another feedback control system 20 at the station 12 to process the signals received from the station 16, and additional feedback systems 20 for each other earth station in the system 10, but this makes the system expensive and complex.

FIG. 2 will be used to show generically the manner in which the present invention enables the earth station 12, which may be considered to be a local station, to receive simultaneously dual or orthogonally polarized signals from a plurality of other or remote earth stations and to cancel, or at least substantially compensate for, the crosspolarization effect with a minimum number of crosscoupling networks such as network K or 22 shown in FIG. 1. Before discussing FIG. 2, one particular aspect about satellite communications systems should be noted. Signals transmitted uplink to the satellite 18 by an earth station such as station 12, are transmitted on one frequency carrier at, for example, 14 GHz, whereas these signals, when transmitted downlink from the satellite 18 to the intended earth station, are received on a different carrier at, for example, 11 GHz. The significance of these two different uplink and downlink carriers is that the crosspolarization due to rain around a given station such as station 12 will be different on the uplink signals than on the downlink signals. Thus, with reference to FIG. 2, if dual polarized signals are transmitted by the station 12 uplink through the propagative medium, and then these same signals are relayed by the satellite 18 downlink through the same propagative medium, back to the station 12, the signals will be crosspolarized differently in the uplink transmission than in the downlink transmission. The effect of this different rain-crosspolarization is indicated as $M_1$ and $M_2$ in FIG. 2, which means that the same rain conditions or medium around the station 12 will produce different crosspolarizations on the uplink and downlink transmission paths. It should be noted that whereas in FIG. 1, the terms $M_1$ and $M_2$ related to the rain-crosspolarization at separate earth stations on the uplink and downlink paths, respectively, in FIG. 2 and the remaining figures, $M_1$ and $M_2$ are used to denote such different rain-crosspolarization around a single earth station such as station 12 for the uplink and downlink paths.

FIG. 2 illustrates apparatus 38 at a single earth station such as station 12 for compensating for the crosspolarization effect so as to enable the receiving of signals simultaneously from earth station 14, earth station 16 and other earth stations in the satellite communications system 10, as indicated, as well as from the station 12.

The apparatus 38 includes an adaptive feedback control system 20' which is substantially the same as the feedback system 20 shown in FIG. 1. The system 20' includes a crosscoupling network $K_2$ or 22', which is substantially the same as the network 22. Also included in the system 20' are the filters 24-1, 24-2 and detectors 26-1, 26-2 which are used to control the network 22' in the same manner that network 22 is controlled.

The apparatus 38 also includes a second crosscoupling network $K_1$ of 40 which is substantially the same as the crosscoupling network 22'. A function generator 42 responds to various input signals to produce output signals for controlling the crosscoupling network 40. Both embodiments of the present invention to be described employ the adaptive feedback control system 20', the crosscoupling network 40 and the function generator 42. In one embodiment, the network 40 is controlled directly by the network 22' through the function generator 42. That is, signals corresponding to the setting of the phase shifters and attenuators in the network 22' are fed to the function generator 42, which responds to these signals by generating output signals to control the network 40. Thus, the setting of the phase shifters and attenuators in the network 40 are locked to or follow the setting of the shifters and attenuators in the network 22'. In the other embodiment, a circuit 44 is included in the apparatus 38, to receive, as input information, signals from the output of the feedback system 20' and signals being crosscoupled in the network 40. In this other embodiment, the function generator 42 provides output signals to control the network 40 in response to output signals from the circuit 44, and not from the signals mentioned above corresponding to the settings in the network 22'.

The apparatus 38 is used to cancel, or at least substantially compensate for, the rain crosspolarization effects occurring as a result of the weather conditions around the station 12. The network 40 is controllable to compensate the signals to be transmitted by the station 12 for the uplink rain-crosspolarization, while the network 22' is controllable to compensate for the rain-crosspolarization of all incoming signals from the other stations as well as the station 12 due to the downlink transmission. This will enable simultaneous reception and crosspolarization cancellation or compensation by the apparatus 38 in the station 12 in the following manner.

Each earth station in the satellite communications system 10, including the stations 12, 14 and 16, will have the apparatus 38. This means that the signals being transmitted uplink from any of the earth stations 12, 14 and 16 will arrive at the satellite 18 without being crosspolarized due to their respective local rain conditions since each crosscoupling network 40 will compensate for such rain-crosspolarizations. Then, when the uplink signals are relayed by the satellite 18 downlink to the receiving station 12, all of these signals from the various stations will be rain-crosspolarized in the same manner since they all pass through the same rain conditions around the station 12. Therefore, since the crosscoupling network 22' compensates for the downlink crosspolarization occurring due to this rain condition at the earth station 12, all of the incoming signals will be compensated.

FIG. 3 illustrates one embodiment or apparatus 38' of the apparatus 38 shown in FIG. 2. The apparatus 38' includes the adaptive feedback control system 20', the corresponding network 40 and the function generator 42, all of which are at a single earth station such as local station 12. In order to explain this embodiment, the apparatus 38' is shown as transmitting the dual-polarized signals $x_1$ and $x_2$ along with the dual-polarized pilot or reference signals $f_1$ and $f_2$ through the crosscoupling network 40 and then via an uplink path through medium $M_1$ to the satellite 18. The apparatus 38' then receives its own transmission from the satellite 18 via the downlink path through the same medium $M_2$ and crosscouples the signals through the adaptive feedback system 20' to obtain the pure signals of $y_1$, $y_2$, $f_1$ and $f_2$. The purpose of this transmission and reception, as will be further described, is to use signals $f_1$ and $f_2$ to adjust the crosscoupling networks 40 and 22' to compensate for the crosspolarization on the propagated signals occurring, respectively, during the uplink and downlink transmission. Actually, the station 12 need only receive the pilot signals $f_1$ and $f_2$ to so adjust the crosscoupling networks 40 and 22', as will become apparent. Once the crosscoupling networks 40 and 22' are set to cancel, or at least substantially compensate for, this crosspolarization, and assuming all other remote earth stations in the satellite communications system 10 have set their apparatus 38', then the station 12 can receive simultaneously transmissions from all such other earth stations. These transmissions can be processed simultaneously through the crosscoupling network 22' to cancel the downlink crosspolarization effect due to the rain conditions around the station 12.

As described in the Appendix, for the same earth station such as station 12, the crosspolarization due to $M_1$, on the uplink path, and the crosspolarization on the downlink due to $M_2$, will be highly correlated. That is, since the crosspolarization of the signals transmitted uplink will be different than the crosspolarization of the signals transmitted downlink due primarily to the different carrier frequencies, $M_1$ is a known function of $M_2$. Mathematically, as given in the Appendix, this relationship is as follows:

$$M_1 = \hat{f}(M_2) \quad (1)$$

Since the crosscoupling network 40 or $K_1$ is to compensate for the uplink crosspolarization $M_1$, and the crosscoupling network 22' or $K_2$ is to compensate for the downlink crosspolarization $M_2$, then the adjustment for the crosscoupling network 40 will be a known function of the setting of the crosscoupling network 22'. Mathematically, this is written as follows:

$$K_1 = \hat{g}(K_2) \quad (2)$$

Consequently, the generator 42 is a function generator which controls the adjustment of the crosscoupling network 40 as a function of the adjustment of the crosscoupling network 22'. The feasability of the technique to be described in relation to FIG. 3 depends on the possibility of obtaining the correlation function $\hat{f}$ in equation 1, and then designing the function generator 42, i.e., the function $\hat{g}$, to follow any variation in the correlation function $\hat{f}$. It is in fact possible to obtain this correlation function $\hat{f}$ and the details are described in the Appendix.

To simplify the description, FIG. 3 illustrates only one half of the crosscoupling networks 40 and 22'. These halves are used to purify the signal $x_2$ so that a pure signal $y_2$ is obtained at the output of the adaptive feedback control system 20'. The other half of the networks 40 and 22' will be the same, and it will be appreciated by those skilled in the art that the signal $x_1$ can be purified to obtain $y_1$ in a similar manner.

The one half of the crosscoupling network 40 for purifying the signal $y_2$ includes an adjustable phase shifter 46 and an adjustable attenuator 48, the output of which is coupled to an adder 50. Also shown is an adder 52 in the crosscoupling network 40. The function generator 42 includes a memory 54 and an uplink parameter generator 56. The parameter generator 56 has four inputs labeled $a_1$, $a_2$, $\zeta_1$ and $\zeta_2$. These inputs constitute voltage signals which represent, respectively, the parameter or setting of the shifters and attenuators in the crosscoupling network 22'. Thus, $a_2$ constitutes a voltage signal representing the setting of the attenuator 30, while $\zeta_2$ is a voltage signal representing the setting of the phase shifter 28.

The function $\hat{g}$ in equation 2, as noted in Appendix 1, can be specified by two complex variables $g_1$ and $g_2$. The parameter generator 56, therefore, receives four additional input voltage signals from the memory 54. Two of these input signals represent the function $g_1$ and are shown as $|g_1|$ and $g_1(\phi)$ corresponding to the amplitude and phase of $g_1$. The other two input signals represent the complex variable $g_2$ and are similarly shown as $|g_2|$ and $g_2(\phi)$ representing the amplitude and phase of $g_2$.

The functions $g_1$ and $g_2$ are variable since they depend not only on the carrier frequencies, but also, on the intensity of a rainstorm around the station 12. The memory 54, therefore, stores a plurality of values for $g_1$ and $g_2$ corresponding to various intensities of rainstorms that may be expected in the area of the earth station 12. These values for $g_1$ and $g_2$ can be calculated in advance and then stored in the memory 54. The fact that the variables $g_1$ and $g_2$ are dependent on rain intensity, implies that the memory 54 must receive information as to the rain intensity during operation of the apparatus 38' to output the correct values of the variables $g_1$ and $g_2$. As described in the Appendix, any of the parameters $a_1$, $a_2$, $\zeta_1$ or $\zeta_2$ can be used as an indicator of rain rate in determining the values of the functions $g_1$ and $g_2$. FIG. 3 illustrates the use of the parameter $a_1$ which is fed as the input to the memory 54, whose output will then be the four voltage signals identifying $g_1$ and $g_2$ having values corresponding to the rain intensity.

The parameter generator 56 receives the eight input voltage signals indicated in FIG. 3, combines them in a particular way to be described in connection with FIG. 4, and then outputs four voltage signals $a_1'$, $a_2'$, $\zeta_1'$ and $\zeta_2'$ which control, respectively, the parameters or settings of the attenuators and phase shifters in the network 40. The attenuator 48 is thus regulated by one voltage signal $a_2'$ to change its parameter or setting and the phase shifter 46 is adjusted by another voltage signal $\zeta_2'$ to have its setting varied in accordance with this voltage signal.

In the operation of the apparatus 38', assume that, while communicating with another station, the intensity of a rainstorm in the area surrounding the station 12 increases and that, therefore, the crosscoupling networks 40 and 22' have to be reset to cancel the new crosspolarization effects. The station 12 will continue transmitting the dual polarized pilot signals $f_1$ and $f_2$ to the satellite 18, and receive back these pilot signals $f_1$ and $f_2$.

During the transmission of the pilot signal $f_1$, uplink from the network 40 and then downlink to the feedback control system 20', the crosspolarization effect will result in some signal energy of the pilot signal $f_1$ being transferred into the pilot signal $f_2$. The received pilot signal $f_1$ is then fed through the phase shifter 28 and attenuator 30 to the adder 32, while the received pilot signal $f_2$, which now has some signal energy of the pilot signal $f_1$ crosspolarized into it, is also fed to the adder 32, as shown in FIG. 3. The filter 24-1, which has one input coupled to the output of the attenuator 30 and another input coupled to receive such received pilot signal $f_2$, filters the pilot signals $f_1$ in these two input signals and feeds them to the detector 26-1.

At this time, the two pilot signals $f_1$ will have a difference in amplitude and phase. The detector 26-1 then provides two output voltage signals proportional, respectively, to the difference in phase and amplitude between the input signals $f_1$. One voltage signal then adjusts the phase shifter 28 and the other voltage signal adjusts the attenuator 30.

The process of adjusting the shifter 28 and attenuator 30 continues until the amplitude and phase of the two pilot signals $f_1$ fed into the detector 26-1 are the same. When there is no such difference in the amplitude and phase of the pilot signals $f_1$ received by the detector 26-1, this indicates that any interference due to some signal energy of signal $f_1$ in the signal $f_2$ received by the system 20' is cancelled or at least substantially compensated for. That is, the phase shifter 28 and attenuator 30 will be set such that the amount of signal energy of the signal $f_1$ crosspolarized into the signal $f_2$ will be cancelled in the adder 32 by the signal whose amplitude and phase has been adjusted by the shifter 28 and attenuator 30. Thus, the system 20' will compensate for the round trip cross-polarization effects produced in the uplink by $M_1$ (and network $K_1$) and the downlink by $M_2$.

For the reasons given above, the signals entering the satellite 18 from the station 12 should not be cross-polarized. This will not be the case if the crosscoupling network 22' is only adjusted as described above; therefore, this is the reason for controlling the network 40 so that it introduces some crosspolarization into signals $f_1$ and $f_2$ before transmitting these signals, which crosspolarization will then be cancelled by the propagative medium $M_1$ during transmission to the satellite 18. With the network 22' set as indicated above when the detector 26-1 senses no difference in amplitude and phase between the input pilot signals $f_1$, the parameters of the shifter 28 and attenuator 30 are properly set for controlling the network 40. The function generator 42 thus responds to these parameters of the network 22' to adjust the phase shifter 46 and attenuator 48. Consequently, some energy of the signal $f_1$ is crosscoupled through the phase shifter 46 and attenuator 48 into the signal $f_2$ via the adder 50. Thereafter, when this signal $f_2$ with the crosscoupled signal $f_1$ is transmitted uplink to the satellite 18, the latter signal $f_1$ will be cancelled due to the crosspolarization effect by $M_1$. With the networks 22' and 40 thus adjusted, and assuming each earth station in the system 10 has so adjusted its networks 22' and 40, it will be appreciated that the earth station 12 can now receive simultaneously dual polarized signals $x_1$ and $x_2$ from every earth station and purify these signals to provide the output signals $y_1$ and $y_2$. It will be seen that in practice, since network 40 is directly controlled by network 22' through generator 42, during the resetting operation each of these networks is simultaneously being reset until the adjustment is made for cancelling the uplink and downlink crosspolarization.

It also can be seen that the apparatus 38' constitutes a closed-loop control system for adjusting the networks 40 or $K_1$ and 22' or $K_2$. Closed-loop control of network 40 is produced by sending the signals $f_1$, $f_2$ through the network 40 to the satellite 18 and receiving the signals $f_1$, $f_2$ from the satellite 18 and via the network 22' for coupling to, for example filter, 24-1 and detector 26-1. The output of detector 26-1 essentially is coupled to function generator 42 whose output then controls network $K_1$. This overall path constitutes a closed loop path for control of network 40. Also, the output of detector 26-1 is used to control the network 22' in response to signal $f_1$, whereby a closed loop path is provided for network 22'.

FIG. 4 illustrates in more detail the uplink parameter generator 56. This generator 56 includes two adders 58 and 60 and two multipliers 62 and 64. The adder 58 adds the voltage signals $\zeta_1$ and $g_2(\phi)$ to produce the voltage signal corresponding to the parameter $\zeta'_2$. The adder 60 adds the voltage signals $\zeta_2$ and $g_1(\phi)$ to produce the voltage signal $\zeta'_1$. The multiplier 62 multiplies the signal $a_1$ and $|g_2|$ to produce the signal $a_2'$. The multiplier 64 multiplies the signals $|g_1|$ and $a_2$ to produce the signal $a_1'$. The generator 56 as well as the memory 54 can be implemented digitally if the satellite communication system 10 constitutes a digital transmission system, or analog.

In the technique used with the apparatus 38' discussed above, each earth station transmits its own pilot signals and receives them back to compensate the uplink and downlink crosspolarization effects, separately. The received pilot signals always contain the combined effect of both the uplink and downlink crosspolarizations. Therefore, the correlation function $\hat{f}$ has to be known, and, accordingly, the correlation function $\hat{g}$ to obtain the separate information about the uplink and downlink crosspolarizations, respectively. However, if information can be obtained as to the downlink crosspolarization only, then the correlation technique would not be required at all because the uplink crosspolarization can be deduced from this separate downlink crosspolarization information and the pilot signals transmitted and received by the earth station 12. A technique in which the correlation functions are not required will be described in relation to FIG. 5 which illustrates an alternative apparatus 38''.

FIG. 5 shows the adaptive feedback control system 20' which receives various signals from the satellite 18 and includes the crosscoupling network 22', the filter 24-1 and the detector 26-1. The network 22' includes the adjustable phase shifter 28 and adjustable attenuator 30, which are controlled by the output voltage signals from the detector 26-1. As with the FIG. 3 embodiment, the FIG. 5 embodiment will be discussed only in terms of obtaining a purified signal $y_2$, it being appreciated that those skilled in the art would then know how to obtain a purified signal $y_1$. Therefore, only one half of the crosscoupling networks 22' and 40 are shown in FIG. 5.

As may be seen by comparing FIGS. 3 and 5, the crosscoupling network 40 is not controlled directly by the crosscoupling network 20' in FIG. 5 as it is in FIG. 3. That is, the parameters or settings of the phase shifter 28 and attenuator 30 are not employed via the memory 54 and parameter generator 56 to adjust the settings for the phase shifter 46 and attenuator 48. Rather, the circuit 44 (see also FIG. 2) receives input signals from the output of the nework 22' over a path 68 and input signals from the network 40 over paths 70 and 72, and provides output signals over paths 74 and 76 to an amplitude and phase detector 78. The detector 78 constitutes the function generator 42 shown in FIG. 2 and provides output voltage signals over paths 80 and 82 in response to any difference in phase and amplitude between its input signals to control, respectively, the phase shifter 46 and attenuator 48.

The circuit 44 includes a satellite compensation network 84 having an adjustable phase shifter 86 receiving the signals on the path 68 and an variable gain amplifier 88 which receives the phase shifted signals from the phase shifter 86 and provides attenuated output signals over a line 90 to a filter 92 as one input. The other input to the filter 92 is the signal on path 70. The filter 92 thus provides a pair of output signals on lines 94 and 96 to an amplitude and phase detector 98. In response to any difference in phase and amplitude between the signals on lines 94 and 96, the detector 98 provides voltage signals on lines 100 and 102 to adjust the phase shifter 86 and amplifier 88 in a similar manner that detectors 26-1 and 78 control the phase shifters and attenuators in networks 22' and 40.

Another filter 104 receives the output signals on line 90 from the satellite compensation network 84 as one input and the signals on line 72 as the other input. The filter 104 provides the two output signals on the lines 74 and 76 to the detector 78.

The apparatus 38" shown in FIG. 5 will operate in the following manner. Dual polarized pilot signals $f_1$ and $f_2$ are transmitted from the satellite 18 downlink and into the crosscoupling network 22' of the feedback system 20'. These pilot signals $f_1$ and $f_2$ will be crosspolarized only as a result of the crosspolarization produced by $M_2$. In other words, the pilot signals $f_1$ and $f_2$ will have only the downlink crosspolarization effect. This can be accomplished in either of two ways. One way is to place an oscillator (not shown) on the satellite 18, which will then generate the signals $f_1$ and $f_2$ and broadcast them to all the earth stations in the system. Another way is to have the signals $f_1$ and $f_2$ transmitted to the satellite 18 by an earth station which is located in an area where it never rains or rains only slightly such that the rain-crosspolarization effect is negligible, such as an earth station located in a desert area. The signals $f_1$ and $f_2$ thus transmitted by this earth station to the satellite 18 will experience none or negligible rain-crosspolarization in the uplink path, and when these signals are then relayed downlink by the satellite 18 they will contain only the downlink rain-crosspolarization.

The crosscoupling network 22' thus receives the rain-crosspolarized pilot signals $f_1$ and $f_2$ as shown in FIG. 5. The received signal $f_1$, after being phase shifted by the phase shifter 28 and attenuated by the attenuator 30, is fed as one input to the filter 24-1, while the received signal $f_2$, which has some energy of the signal $f_1$ crosspolarized into it, is fed as the other input to the filter 24-1. The filter 24-1, which filters the signals $f_1$, therefore provides two output signals $f_1$ to the detector 26-1. The detector 26-1 then provides two voltage signals which are proportional, respectively, to the difference in phase and amplitude of the signals $f_1$ to adjust the phase shifter 28 and attenuator 30, respectively. When the detector 26-1 detects no difference in amplitude and phase between the two input signals $f_1$, the phase shifter 28 and attenuator 30 will be set such that the signal $f_1$ fed into the added 32 from the attenuator 30 will cancel the signal $f_1$ crosspolarized into the signal $f_2$. Consequently, the network 22' will now be adjusted to cancel the downlink crosspolarization effect.

With the network 22' thus adjusted, the network 40 can now be adjusted to cancel the uplink crosspolarization effect. To do this, the earth station 12 transmits dual polarized pilot signals $f_1'$ and $f_2'$ uplink to the satellite 18, which then relays these signals $f_1'$ and $f_2'$ downlink to the network 20'. The pilot signals $f_1'$ and $f_2'$ are at a different frequency from one another and from the signals $f_1$ and $f_2$. These pilot signals $f_1'$, and $f_2'$ thus will have the combined effect of the uplink and downlink crosspolarizations; however, since the network 22' will cancel the effect of the downlink crosspolarization, the signal $f_2'$ being output by the network 22' from the adder 32 will have some crosspolarized energy of $f_1'$ in it due only to the uplink rain-crosspolarization.

Disregarding the satellite compensation network 84 for the moment, the filter 104 receives the signal $f_2'$ from the lines 68 and 90, and the signal $f_1'$ from the output of the attenuator 48 on line 72. The filter 104, which then filters the two pilot signals $f_1'$ on lines 90 and 72, thus provides these two pilot signals to the detector 78, with one pilot signal $f_1'$ having been relayed through the satellite 18 and having the uplink crosspolarization information, and the other pilot signal $f_1'$ taken directly from the network 40.

The detector 78 then provides output voltage signals on lines 82 and 80, respectively, proportional to any difference in amplitude and phase between its input signals $f_1'$ to adjust the attenuator 48 and shifter 46. When no such difference occurs, the attenuator 48 and shifter 46 will be set such that an amount of signal energy of signal $f_1'$ will be included in $f_2'$ in the adder 50 whereby this signal energy will be cancelled due to the uplink rain-crosspolarization $M_1$ when transmitted to the satellite 18.

It will therefore be appreciated that once the networks 40 and 22' are so adjusted, the signals $x_1$ and $x_2$ will arrive at the satellite 18 with no rain-crosspolarization due to $M_1$, and that the network 22' will cancel the downlink rain-crosspolarization due to $M_2$ to provide purified signals $y_1$ and $y_2$. Of course, as already indicated the signals $x_1$ and $x_2$ will be coming primarily from remote stations transmitting to the local stations, rather than from the local station as shown in FIG. 5.

The two output signals $f_1'$ fed into the detector 78 can't be compared directly without one being processed through network 84 because this one signal will have been transmitted through the satellite 18 while the other will not be. The satellite 18 itself and media $M_1$ and $M_2$ will introduce an amplitude and phase difference between these two signals which should be taken into consideration. Note that this difference is not due to the crosspolarization effect, but rather to the fact that the satellite 18 and media $M_1$, $M_2$ will affect the amplitude and phase of the pure signal $f_1'$ fed into adder 52 and then transmitted uplink. Thus, the function of the satellite compensation network 84 is to compensate for this difference, and it operates in the following manner.

The filter 92 filters the pure signal $f_2'$ on line 70 and the pilot signal $f_2'$ on line 90 and provides these two signals to the detector 98. The detector 98 then provides voltage signals, respectively, on lines 100 and 102 proportional to any difference in phase and amplitude between its input signals $f_2'$ to adjust the amplifier 88 and shifter 86. When this difference is 0, the shifter 86 and attenuator 88 will be set to cancel, or at least substantially compensate for, any such difference in amplitude and phase shift provided by the satellite 18 and media $M_1$, $M_2$. The reason for using the pilot signals $f_2'$ to compensate for the amplitude and phase shifts introduced by the satellite 18 and media $M_1$, $M_2$ is that the only available reference for satellite compensation purposes is the pilot signal $f_2'$. Once this compensation occurs, the signal $f_1'$ fed into the filter 104 will be compensated for the amplitude and phase shift introduced by the satellite 18 and media $M_1$, $M_2$.

As with apparatus 38', the apparatus 38" constitutes a closed-loop control system for adjusting the networks 40 or K, and 22' or $K_2$. Closed loop control of network 22' is produced by receiving signals $f_1$, $f_2$ from the satellite 18 and via the network 22' for coupling to, for example, filter 24-1 and detector 26-1. The output of detector 26-1 is used to control the network 22' in response to signal $f_1$, whereby a closed-loop path for network 22' is provided.

Closed-loop control of the network 40 is produced by sending signals $f_1'$, $f_2'$ through the network 40 to the satellite 18 and receiving the signals $f_1'$, $f_2'$ from the satellite 18 and via the network 22'. The output of network 22', for example signal $f_1'$ is then fed via circuit 44 and detector 78 to control the network 40. It will now be appreciated that while FIGS. 2-5 illustrate apparatus and methods for setting the networks $K_1$ and $K_2$, in a broad aspect, the invention contemplates merely the use of these two or equivalent networks, however they may be adjusted, provided they compensate for the crosspolarization effect as already described. Furthermore, while FIGS. 2-5 illustrate the control of network $K_1$ with network $K_2$, as given in Appendix 1, the network $K_2$ could be controlled with network $K_1$.

While the invention has been particularly shown and described with reference to preferred embodiments thereof, it will be understood by those skilled in the art that the foregoing and other changes in form and details may be made therein without departing from the spirit and scope of the invention.

APPENDIX

Derivation of $\hat{g}$

Let the axis of symmetry of an oblate raindrop be oriented with respect to the horizontal direction at an angle, $\theta$, called the "canting angle," and with respect to the signal propagation direction at an angle, $\gamma$. Let $x_1$, $x_2$ be the transmitted signals, $y_1$, $y_2$ be the received signals propagated through the raindrops. If $\gamma = 90°$, which is the case for horizontal propagation, the relationship between $x_1$, $x_2$ and $y_1$, $y_2$ can be represented by the following expression.

$$\begin{pmatrix} y_1 \\ y_2 \end{pmatrix} = \begin{pmatrix} A & \epsilon\delta \\ \epsilon\delta & B \end{pmatrix} \begin{pmatrix} x_1 \\ x_2 \end{pmatrix} \text{ or } y = M\bar{x} \quad (1)$$

where $$A = T_2 \cos^2 \theta_{\text{eff}} + T_1 \sin^2 \theta_{\text{eff}} \quad (2)$$

$$B = T_1 \cos^2 \theta_{\text{eff}} + T_2 \sin^2 \theta_{\text{eff}} \quad (3)$$

$$\epsilon\delta = \epsilon(T_2 - T_1) \sin \theta_{\text{eff}} \cos \theta_{\text{eff}} \quad (4)$$

$$T_1 = e^{-(\alpha_1 + j\beta_1)L} \quad (5)$$

$$T_2 = e^{-(\alpha_2 + j\beta_2)L} \quad (6)$$

and where $\alpha_1$, $\alpha_2$, $\beta_1$, $\beta_2$ are the attenuation and phase shift constants for signals polarized in the directions of major and minor axes of the raindrops; L is the pathlength; $\epsilon$ and $\theta_{\text{eff}}$ are two empirical parameters characterizing the random variation of the raindrop canting angles. The diagonal elements, A, B, in the matrix, M, represent the wanted signals. The off-diagonal elements, $\epsilon\delta$, represent the crosspolarization. This model holds true for the oblique path of satellite communication in which $\gamma \neq 90°$ if $T_1$, $T_2$ can be slightly modified.

Assume K is a network cross-coupling the two received signals with adjusted amplitude, $a_1$, $a_2$ and phase $\zeta_1$, $\zeta_2$, to cancel the crosspolarization. The variables $a_1$, $a_2$, $\zeta_1$, $\zeta_2$, are controlled by a feedback system which detects the pilot signals contained in the received signal as the reference of adjustment. The effect of the network, K, can always be represented by a matrix multiplication and can always be simplified into the form $$K = \begin{bmatrix} 1 & a_1 e^{j\zeta_1} \\ a_2 e^{j\zeta_2} & 1 \end{bmatrix} \quad (7)$$

and the final received signal after the network is $$\bar{y} = KM_2 M_1 \bar{x} \quad (8)$$

where $M_1$, $M_2$ are the rain crosspolarization matrices for uplink and downlink, respectively. The system is to adjust K according to $M_1$, $M_2$ such that $$KM_2 M_1 = \text{diagonal} \quad (9)$$

The off-diagonal elements are cancelled to be zero; therefore, there will not be any crosspolarization. However, if there is a third ground station transmitting signals with uplink rain crosspolarization matrix, $M_1' \neq M_1$ then $$kM_2 M_1' \neq \text{diagonal} \quad (10)$$

in general. Therefore, this system cannot work for a second signal coming from a third ground station.

In the new approach of the present invention every ground station uses two cross-coupling networks instead of one, $K_1$ and $K_2$, before transmitting and after receiving, to compensate itw own uplink and downlink rain crosspolarization matrices $M_1$ and $M_2^*$, respectively; i.e., to have $$M_1 K_1 = \text{diagonal} \quad (11)$$

$$K_2 M_2 = \text{diagonal} \quad (12)$$

If Eqs. (11) and (12) are satisfied, any signal arriving at the satellite from any ground station will not be crosspolarized since every $M_1$ is compensated by its $K_1$, and these signals can be received by any ground station without crosspolarization since every $M_2$ is compensated by its $K_2$.

*NOTE: From this point on, $M_1$, $M_2$ represent up and downlink rain matrices of the same ground station rather than the same signal, as in Eqs. (8) and (9).

In order to properly control the networks $K_1$ and $K_2$, every ground station should transmit its own pilot signal to the satellite and receive it back from the satellite as the reference to give information about $M_1$ and $M_2$. If the time delay can be neglected due to the slow time variation of crosspolarization phenomenon, $M_1$ and $M_2$ should have every parameter exactly the same except frequency since the uplink and downlink paths are the same, but with different frequencies. In other words, $M_1$ should be a known function of $M_2$, $$M_1 = f(M_2) \tag{13}$$

but $K_1$ and $K_2$ are to compensate $M_1$ and $M_2$, respectively. $K_1$ thus must be a known function of $K_2$, $$K_1 = g(K_2) \tag{14}$$

It will be shown that we can use exactly the same feedback system currently designed by many people to control $K_2$, and then control $K_1$ by $K_2$ directly through a known function, g, without any further feedback loop. The $K_2$ system controlled by feedback will cancel the crosspolarization anyway, thus guaranteeing the round trip matrix to be diagonal.

$$K_2 M_2 M_1 K_1 = \text{diagonal} \tag{15}$$

It will be shown that Eq. (15) will imply Eqs. (11), (12) automatically if we properly design the g function to follow the variation of the f function, and the system thus works.

In the old scheme each station corrected incoming signals from only one station. In the new scheme, each station is to correct its own outgoing signals for the expected uplink cross-polarization and correct its own pilot signal plus all incoming signals from other stations for downlink crosspolarization. It can be shown that two compensating networks per station, as proposed here, is the minimum number required in the general multiple-uplink case.

V. System Description

Let $$M_1 = \begin{bmatrix} A_1 & \epsilon\delta_1 \\ \epsilon\delta_1 & B_1 \end{bmatrix} \tag{16}$$

$$M_2 = \begin{bmatrix} A_2 & 2 \\ \epsilon\delta_2 & B_2 \end{bmatrix} \tag{17}$$

$$K_1 = \begin{bmatrix} 1 & a_1' e^{j\xi_1'} \\ a_2' e^{j\xi_2'} & 1 \end{bmatrix} \tag{18}$$

$$K_2 = \begin{bmatrix} 1 & a_1 e^{j1} \\ a_2 e^{j\xi_2} & 1 \end{bmatrix} \tag{19}$$

Let the function, f, in Eq. (13) be specified by three complex variables, $f_1, f_2, f_3$ as follows:

$$f_1 = A_1/A_2 \tag{20}$$

$$f_2 = B_1/B_2 \tag{21}$$

$$f_3 = \epsilon\delta_1/\epsilon\delta_2 = \delta_1/\delta_2 \tag{22}$$

All of them are supposed to be known variables because f is a known function. Let the function, g, in Eq. (14) be specified by two complex variables, $g_1, g_2$ as follows:

$$g_1 = a_1' e^{j\xi_1'}/a_2 e^{j\xi_2} \tag{23}$$

$$g_2 = a_2' e^{j\xi_2'}/a_1 e^{j\xi_1} \tag{24}$$

Note that $g_1, g_2$ are defined as the "cross-ratio" instead of the "direct ratio" of the off-diagonal elements in $K_1$ and $K_2$. The reason for this will be clear very soon. So long as we know $g_1$ and $g_2$, we can obtain the parameters in $K_1$ directly from knowledge of $K_2$.

Some algebra will show that Eq. (11) requires $$a_1 e^{j\xi_1'} = -\epsilon\delta_1/A_1 \tag{25}$$

$$a_2' e^{j\xi_2'} = -\epsilon\delta_1/B_1 \tag{26}$$

and Eq. (12) requires $$a_1 e^{j\xi_1} = -\epsilon\delta_2/B_2 \tag{27}$$

$$a_2 e^{j\xi_2} = -\epsilon\delta_2/A_2 \tag{28}$$

We find that the right hand sides of Eqs. (25) and (28) are of exactly the same form. For this reason we define $g_1$ to be the ratio of them in Eq. (23). Similarly, we define the ratio of Eqs. (26) to (27) as $g_2$ in Eq. (24) because their right hand sides are of the same form. Substituting the ratio in Eqs. (20) through (22), we have the following simple expressions:

$$g_1 = f_3/f_1 \tag{29}$$

$$g_2 = f_3/f_2 \tag{30}$$

Note that the "cross-ratio" definition of $g_1, g_2$ in Eqs. (23), (24) simplifies the expression in Eqs. (29), (30). This is actually due to the reverse order of matrices in Eqs. (11), (12); i.e., $K_1$ is applied before the effect of $M_1$ but $K_2$ is applied after the effect of $M_2$. Since the variables, $f_1, f_2, f_3$, are supposed to be known, $g_1, g_2$ are therefore known, and we can control $K_1$ directly from knowledge of $K_2$. $K_2$ is controlled by the currently desiged feedback system; the whole system thus works.

We next have to check if the $g_1, g_2$ in Eqs. (29), (30) do imply that Eqs. (11), (12) can be satisfied. Let the matrix, $K_2$, be $$K_2 = \begin{bmatrix} 1 & \tilde{x} \\ \tilde{y} & 1 \end{bmatrix} \tag{31}$$

where $\tilde{x}, \tilde{y}$ are the phase and amplitude adjustment controlled by the feedback loop. $K_1$ will then be, if controlled by the above scheme, $$K_1 = \begin{bmatrix} 1 & (f_3/f_1)\tilde{y} \\ (f_3/f_2)\tilde{x} & 1 \end{bmatrix} \tag{32}$$

and the round trip matrix is $$K_2 M_2 M_1 K_1 = \begin{bmatrix} W_1 & \overline{xP_1} \\ \overline{xP_2} & W_2 \end{bmatrix} \tag{33}$$

The feedback $K_2$ system will guarantee this matrix to be diagonal, $$\overline{xP_1} = 0 \tag{34}$$

$$\overline{xP_2} = 0 \tag{35}$$

It can be shown that Eqs. (16), (17), (31)~(35) have a unique solution for $\tilde{x}, \tilde{y}$, which is $$\tilde{x} = -\epsilon\delta_2/B_2 \tag{36}$$

$$\tilde{y} = -\epsilon\delta_2/A_2 \tag{37}$$

These are exactly Eqs. (27) and (28), therefore Eqs. (25), (26) and thus Eqs. (11), (12) will be satisfied and the system does work.

The control system thus adjusts $K_2$, and through the g function, $K_1$ to make the total round trip signal uncrosspolarized. By the correct choice of the g function, this also results in the uplink and downlink being uncrosspolarized separately.

A critical issue is that the function g, Eqs. (29) and (30), is varying. It depends on not just the path and frequency but also on the intensity of the rainstorm. The function relating $K_1$ and $K_2$ must therefore be constantly modified to reflect changing conditions. The g function can be derived from local information on the rain storm or more practically, from measurement of $K_2$ itself. That is, the adjusted value of $K_2$, which gives diagonal to the round trip matrix, can be used as a measure of the rain intensity in defining the function g. As long as $K_2$ is monotonic function of the rainstorm, this procedure will not introduce ambiguities in the final solution.

What is claimed is:

1. Apparatus for controlling the crosspolarization between dual reference signals propagated in a frequency reuse satellite communications system having a plurality of stations communicating via a satellite, in which the dual reference signals transmitted by each station are of different polarization, and the propagative medium around each station causes the crosspolarization of the dual reference signals transmitted and received by each station, the apparatus being for use at each station, comprising:
    (a) first means for controllably crosscoupling the dual reference signals being transmitted by the station to the satellite to compensate for the crosspolarization due to the propagative medium, including first means for adjusting the amplitude and phase of the dual reference signals being crosscoupled and transmitted; and
    (b) second means for controllably crosscoupling the dual reference signals being received by the station via the satellite to compensate for the crosspolarization due to the propagative medium, including second means for adjusting the amplitude and phase of the received dual reference signals being corsscoupled; wherein
    (c) said first crosscoupling means includes means, coupled to said second crosscoupling means, for generating output signals representing a correlation between the crosspolarization produced by the propagative medium acting on the dual reference signals transmitted by the station to the satellite and the dual reference signals received by the station, said first adjusting means being responsive to the output signals to adjust the amplitude and phase of the dual reference signals being crosscoupled and transmitted, said generating means including
        (i) memory means, coupled to said second adjusting means, for storing predetermined pairs of first and second complex variable signals, each of the first and second complex variable signals having amplitude and phase information, said second adjusting means including means for producing control signals representing the adjustment in amplitude and phase of the received and crosscoupled dual reference signals, and said memory means having means for outputting one pair of the complex variable signals in response to one of the control signals, and
        (ii) means, responsive to the one pair of complex variable signals and the control signals, for producing the output signals.

2. Apparatus for controlling the crosspolarization between first and second reference signals propagated in a frequency reuse satellite communications system having a plurality of stations communicating via a satellite, in which the first and second reference signals transmitted by each station are of different polarization, and the propagative medium around the station causes the crosspolarization of the first and second reference signals transmitted and received by each station, the apparatus being for use at each station, comprising:
    (a) first means for controllably crosscoupling the first and second reference signals being transmitted by the station to the satellite to compensate for the crosspolarization due to the propagative medium, including means for adjusting the amplitude and phase of the first and second reference signals being crosscoupled; and
    (b) second means for controllably crosscoupling the first and second reference signals being received by the station via the satellite to compensate for the crosspolarization due to the propagative medium; wherein
    (c) said first crosscoupling means includes means, responsive to the first and second reference signals which have been crosscoupled by said second crosscoupling means, for generating output signals representing the crosspolarization of the first and second reference signals transmitted to the satellite, said adjusting means being responsive to the output signals to adjust the amplitude and phase of the first and second reference signals being crosscoupled and transmitted, said generating means including
        (i) first means for producing a first pair of signals, one corresponding to the first reference signal crosscoupled by said second crosscoupling means and the other corresponding to the first reference signal crosscoupled into the second reference signal by said first crosscoupling means; and
        (ii) second means, connected to said first producing means, for producing a second pair of control signals representing the difference in amplitude and phase between the first pair of signals, the second pair being the output signals.

3. Apparatus for controlling the crosspolarization between dual reference signals propagated in a frequency reuse satellite communications system having a plurality of stations communicating via a satellite, in which the dual reference signals transmitted by each station are of a different polarization, and the propagative medium around each station causes the crosspolarization of the dual reference signals transmitted and received by each station , the apparatus being for use at each station, comprising:
    (a) first means for controllably crosscoupling in phase and amplitude the dual reference signals being transmitted by the station to the satellite to compensate for the corsspolarization due to the propagative medium;
    (b) second means for controllably crosscoupling and for adjusting in phase and amplitude the dual reference signals being received by the station via the satellite to compensate for the crosspolarization due to the propagative medium, including means for generating first, second, third and fourth control signals proportional to the adjustment in amplitude and phase of the dual reference signals, respectively, and (c) means, responsive to said control signals, for generating output signals representing a correlation between the crosspolarization produced by the propagative medium acting on the dual reference signals transmitted by the station to the satellite and the dual reference signals received by the station, including (i) memory means, responsive to one of said control signals, for producing a pair of complex variable signals, the pair having a first amplitude signal, a first phase signal, a second amplitude signal and a second phase signal; and (ii) parameter generator means for generating a first output amplitude signal, a first output phase signal, a second output amplitude signal and a second output phase signal, including a first adder for adding the first phase control signal and the second phase signal of the pair to produce the second output phase signal, a second adder for adding the second phase control signal and the first phase signal of the pair to produce the second output phase signal, a first multiplier to multiply the first amplitude control signal and the second amplitude signal of the pair to produce the second output amplitude signal, and a second multiplier to multiply the second amplitude control signal and the first amplitude signal of the pair to produce the first output amplitude signal, wherein said first crosscoupling means is responsive to the first output signal, the second output signal, the third output signal and the fourth output signal.

4. Apparatus for controlling the crosspolarization between first dual signals propagated in a frequency reuse satellite communications system having a plurality of remote stations and a local station communicating via a satellite, in which the first dual signals transmitted by each station are of different polarization and the propagative medium around the local station causes the crosspolarization of the first dual signals transmitted by the remote stations and the local station, the apparatus being for use at the local station, comprising:

(a) first adjustable means for controllably crosscoupling the first dual signals transmitted by the local station to the satellite to compensate for the crosspolarization due to the propagative medium;

(b) second adjustable means for controllably crosscoupling the first dual signals received by the local station via the satellite to compensate for the crosspolarization due to the propagative medium; and (c) closed-loop control means for transmitting second dual-polarized reference signals via said first adjustable means and through the propagative medium, and for receiving the transmitted reference signals through the propagative medium and via said second adjustable means, said second adjustable means being adjusted in response to the received reference signals to control the crosscoupling of the received first dual signals and said first adjustable means being adjusted in response to the received reference signals to control the crosscoupling of the transmitted first dual signals.

5. Apparatus according to claim 4 wherein said first adjustable means comprises first crosscoupling network means for adjusting the amplitude and phase of the first dual signals and the second reference signals and wherein said second adjustable means comprises second crosscoupling network means for adjusting the amplitude and phase of the first dual signals and the second reference signals.

6. Apparatus according to claim 5 wherein said closed-loop control means comprises:

(a) filter and second reference signal detector means for adjusting said second crosscoupling means in response to the second reference signals; and (b) function generator means for adjusting said first crosscoupling network means in response to the amplitude and phase adjustment of said second crosscroupling network means.

7. Apparatus for controlling the crosspolarization between first dual signals propagated in a frequency reuse satellite communications system having a plurality of remote stations and a local station communicating via a satellite, in which the first dual signals transmitted by each station are of different polarization, and the propagative medium around the local station causes the crosspolarization of the first dual signals transmitted by the remote stations and the local station. comprising:

(a) first adjustable means for controllably crosscoupling the first dual signals transmitted by the local station to the satellite to compensate for the crosspolarization due to the propagative medium;

(b) second adjustable means for controllably crosscoupling the first dual signals received by the local station via the satellite to compensate for the crosspolarization due to the propagative medium;

(d) first closed-loop control means, including said first adjustable means, for transmitting second dual-polarized reference signals uplink via said first adjustable means through the propagative medium, and for receiving the second transmitted reference signals through the propagative medium down-link via said second adjustable means, said first adjustable means being adjusted in response to the second reference signals received down-link via said second adjustable means; and (e) second closed-loop control means, including said second adjustable means, for receiving third dual-polarized reference signals being received down-link through the propagative medium into said second adjustable means, the third reference signals having substantially only down-link crosspolarization due to the propagative medium, said second adjustable means being adjusted in response to the third reference signals received via said second adjustable means.

8. Apparatus according to claim 7 wherein said first adjustable means comprises first crosscoupling network means for adjusting the amplitude and phase of the first dual signals and the second reference signals and wherein said second adjustable means comprises second crosscoupling network means for adjusting the amplitude and phase of the first dual signals, the second reference signals and the third reference signals.

9. Apparatus according to claim 8 wherein said first closed-loop control means comprises function generator means for adjusting said first crosscoupling network means in response to the second reference signals adjusted by said second crosscoupling means.

10. Apparatus according to claim 9 wherein said second closed-loop control means comprises filter and third reference signal detector means for adjusting said second crosscoupling network means in response to the third reference signals.

11. Apparatus according to claim 10 wherein said means for receiving receives the third reference signals from said satellite, and said satellite also relays the transmitted second reference signals to said second crosscoupling network means.

12. Apparatus according to claim 11 wherein said function generator means includes means, responsive to the second reference signals adjusted by said second crosscoupling network means, for compensating the first transmitted signals for amplitude and phase shifts introduced by said satellite.

* * * * *

UNITED STATES PATENT AND TRADEMARK OFFICE
CERTIFICATE OF CORRECTION

PATENT NO. : 4,292,685

DATED : September 29, 1981

INVENTOR(S) : Lin-Shan Lee

It is certified that error appears in the above—identified patent and that said Letters Patent is hereby corrected as shown below:

Column 10, line 67, after "the" and before "22'" it should read --network--.

Column 17, line 48, before "wherein" it should read --crosscoupled--.

Column 18, line 65, after "the" and before "due" it should read --crosspolarization--.

Signed and Sealed this

Sixth Day of April 1982

[SEAL]

Attest:

Attesting Officer

GERALD J. MOSSINGHOFF

Commissioner of Patents and Trademarks